United States Patent [19]

Tsumura

[11] Patent Number: 5,250,747
[45] Date of Patent: Oct. 5, 1993

[54] KARAOKE MUSIC REPRODUCTION DEVICE

[75] Inventor: Mihoji Tsumura, Osaka, Japan

[73] Assignee: Ricos Co., Ltd., Osaka, Japan

[21] Appl. No.: 881,815

[22] Filed: May 12, 1992

[30] Foreign Application Priority Data

Jul. 31, 1991 [JP] Japan .................................. 3-216107

[51] Int. Cl.⁵ .......................... G09B 15/04; G10H 7/00
[52] U.S. Cl. .................................. 84/645; 84/477 R; 358/342
[58] Field of Search .................................. 84/601–603, 84/609–614, 634–638, 645, 671, 464 R, 464 A, 477 R, 478; 358/342

[56] References Cited

U.S. PATENT DOCUMENTS

| | | |
|---|---|---|
| 1,213,804 | 1/1917 | Cahill .................................. 84/671 |
| 5,046,004 | 9/1991 | Tsumura et al. . |
| 5,127,303 | 7/1992 | Tsumura et al. . |
| 5,131,311 | 7/1992 | Murakami et al. .................. 84/609 |

*Primary Examiner*—Stanley J. Witkowski
*Attorney, Agent, or Firm*—Thompson, Hine and Flory

[57] ABSTRACT

The invention relates to a technique whereby karaoke music and lyrics, which have been digitalized with the help of MIDI data, are transmitted by public telephone line for reproduction on a terminal unit. Associated dynamic images are, on account of the volume of data required, stored independently of the music and lyric data within the terminal unit itself and retrieved and extracted with the help of codes which are written into the data in advance. The dynamic images and the lyrics are finally mixed and output to a visual display medium.

7 Claims, 2 Drawing Sheets

KARAOKE MUSIC REPRODUCTION DEVICE

BACKGROUND OF THE INVENTION

1. Field of the Invention

The invention relates to a karaoke music reproduction device which uses digital signals for the control of a MIDI sound source while at the same time generating a synchronous display of lyric related data expressed in character, graphic or some other form on a visual display medium. The invention relates more particularly to a technique for the selection, by a means other than the lyric display means, of images to match the mood of the music and the subsequent display of said images on the display screen along with said lyrics.

2. Description of the Prior Art

There are well known techniques relating to the use of a sound source in the creation of music in accordance with the MIDI standard and the subsequent reproduction of said music. The fact that karaoke music is essentially a musical accompaniment with the vocals cut out also facilitates the reproduction of such music through a MIDI sound source. The inventors formerly disclosed the technology involved in the above aspects of karaoke music in U.S. Pat. No. 5,046,004 and U.S. Pat. No. 5,127,303. It is also necessary, for karaoke purposes, to supply the user with the lyrics of the songs he wishes to perform and the most recent trend has been to display said lyrics on a visual display medium in time with the music. Techniques for the display of lyrics are also covered by the disclosures of the patents referred to above. Clearly, then, it is perfectly possible to use this sort of technology to create audio signals through the medium of a MIDI sound source and then to pass said signals through an amplifier to a speaker for reproduction in the form of music. At the same time, it is also clearly possible to display song lyrics in time with said music. Moreover, since the use of MIDI data enables a very significant reduction in the amount of data required compared with, say, PCM recording, it is also possible to transmit the required data from a host computer via a public telephone line to a user's terminal unit for reproduction using the techniques developed by the aforementioned inventors.

However, if the data is structured such that it contains only MIDI data and lyric data, then this quite naturally means that nothing other than the song lyrics can be displayed on the display screen and this in turn precludes the background display of dynamic images which again represent a mode of karaoke music presentation which is also becoming very popular these days. It has thus become necessary, from the presentational point of view, to provide dynamic images as a background against which song lyrics can be displayed. Dynamic images, however, require a much larger volume of data than do either MIDI data or lyric data and, if the whole of this volume of data is to be transmitted by public telephone line, then the download operation will itself take much too long. In other words, the adverse effect on the data transmission operation is due not to the essential MIDI and lyric data but to the inclusion of incidental image-related presentation data. Since, therefore, in the final analysis, dynamic images represent nothing more than an embellishment of the presentation of karaoke music, it is better to structure them quite separately from the music itself. A further problem is that, if the dynamic images are, in fact, incorporated into the basic music and lyric data then they must also necessarily become fixed in their relationship to the music and there is thus an obvious danger that the dynamic background images might eventually lose their visual impact on the user.

SUMMARY OF THE INVENTION

It is the object of the present invention to provide a device which will increase the efficiency with which karaoke data is transmitted from a host computer by way of a telephone line to a user's home while at the same time maintaining the effectiveness of the presentational features of the karaoke music system.

It is another object of the invention to extract those dynamic images which seem most appropriate to the mood of the karaoke music that has been requested and to present said images on a visual display medium by mixing the lyrics with the dynamic images.

It is still another object of the invention to provide a technique for the separation of the MIDI data and lyric data, which are required for the song itself, from the dynamic image data, which is required only for its auxiliary presentational effect. This will in turn enable not only the more efficient processing of each type of data but also the creation of more than one different mix of music and dynamic images.

It is a further object of the invention to provide a technique to ensure that the appropriate dynamic images are presented without delay during reproduction of the requested piece of karaoke music.

We determined that the basic conditions for the achievement of the above objects should include the adoption of a data structure that would enable the transmission of MIDI data and lyric data, which is comparatively limited in size, by way of public telephone lines, along with the independent storage of the large amounts of data required for the auxiliary dynamic images in the user's terminal unit itself. Once stored, the dynamic image data groups could each then be used as the background for various different pieces of karaoke music.

The present invention assumes the transmission of karaoke data in the form of digital MIDI data and lyric data signals from a host computer by way of a public telephone line to a user's terminal unit through the medium of which a karaoke music reproduction device then reproduces music in accordance with the MIDI data and displays the lyrics on a visual display medium in accordance with the lyric data received. The data itself will be structured in such a way that there is always a special code incorporated into the karaoke data header. The terminal unit incorporates two memory means, each of which holds a plurality of identical dynamic images. Moreover, before the reproduction of the music is initiated, the aforementioned code is first of all identified and used as a retrieval condition for the alternate access of each of the two memory means. This prevents the occurrence of any delay in the output of the dynamic images to the screen.

Further objects, design features and benefits of the present invention may be clarified by reference to the following detailed description of the preferred embodiment of the invention and the accompanying drawings.

DESCRIPTION OF THE PREFERRED EMBODIMENT

The following is a detailed description of the preferred embodiment of the invention by reference to the accompanying drawings.

Figure 1:
FIG. 1 is a conceptual drawing illustrating the structure of karaoke data for use with the present invention.

FIG. 1 illustrates the structure of the data relating to a piece of music for transmission by way of a public telephone line from a host computer to a user's terminal device. At the head of the data string comes the header A, which contains a range of information including the size of the data of said piece of music and an error-correcting code. Next comes the lyric data B which comprises character data providing information such as the words of the song, the name of the song and the composer. This is followed by the MIDI data C, which comprises music data that has been created in accordance with the MIDI standard and which is used to drive a MIDI sound source. Finally comes the footer D, which contains data such as the end code. The MIDI data C also contains synchronization codes which enable operations such as the display of the lyrics on screen in time with the reproduction of the music and the changing of the screen color in order to indicate the current position in the performance. This latter feature actually indicates to the singer at all times precisely where he should be up to in his rendition of the song by causing the on-screen lyrics, for example, to change color in time with the music. The header A also contains essential data such as the type of music, the basic mood and the season which in turn enable the selection of an appropriate group of dynamic images. This process will be described in more detail below. Moreover, for the purposes of transmission by public telephone line, the data is assembled in packet form and error correction procedures are carried out in order to keep the numbers of transmission errors to a minimum.

Figure 2:
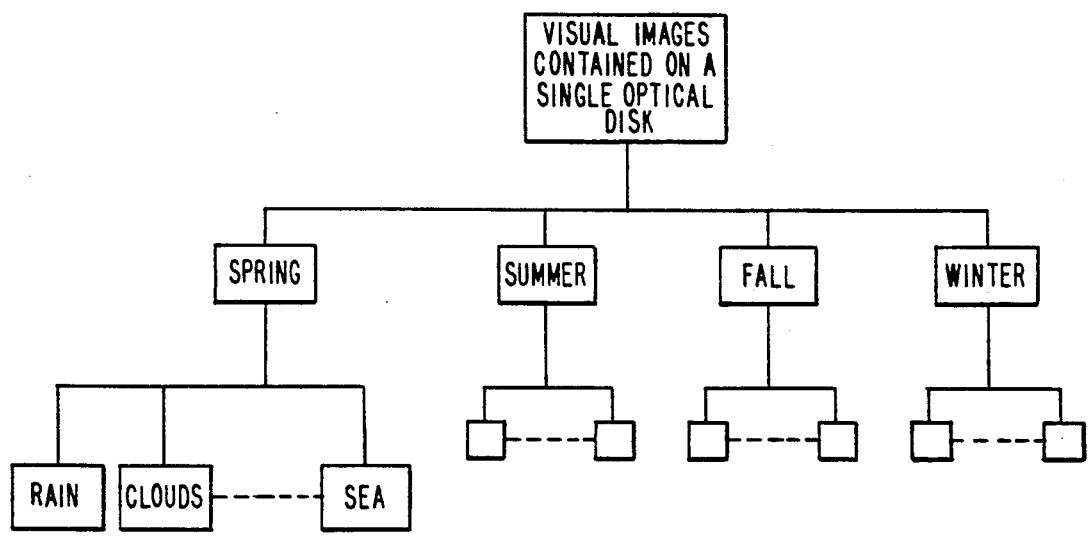
FIG. 2 is a conceptual drawing illustrating the tree structure of dynamic image data groups stored on an optical disk which functions as the memory means.

Next, there follows an explanation of the groups of dynamic image data stored in the terminal device. The dynamic images themselves are first of all divided into a plurality of different types of image, each of which is then assigned an appropriate code. Moreover, these dynamic images are not unrelated to each other but are, in fact, linked in a way somewhat similar to that of a directory tree, for example. An example of this sort of tree structure is shown in FIG. 2. The tree in FIG. 2, for example, consists entirely of dynamic image data which is coded to form a hierarchical structure with seasons on the first level and weather or scenic view related features on the second level. Generally speaking, a karaoke music library needs to contain at least 2,000 pieces of music if it is to fully satisfy all its potential users. If, however, dynamic images were to be assigned individually to each piece of music in a library of this size, the amount of data requiring storage would be immense and this would call in turn for the installation of an extremely large number of storage disks. This problem applies even in the case of optical disks despite their reputation for offering very substantial unit storage capacity. However, as has been explained above, dynamic images play no more than an auxiliary role relating to the presentation rather than the actual performance of karaoke music, and it is for this reason undesirable that the amount of storage space required for said dynamic images should be allowed to assume overly large proportions. The inventors thus determined that it would be better to store the dynamic image data separately. Moreover, since, as we explained above, dynamic images play only a supporting role in the enjoyment of karaoke music and do not have a direct effect either on the performance of a piece of music or on the display of the accompanying lyrics, it would therefore make little material difference if the storage space allocated to the whole of the dynamic image data were restricted to just one optical disk. Assuming an optical disk reproduction density of approximately 120 minutes plus sufficient index data for roughly four minutes of dynamic image time per song, a single disk would provide enough storage space for about 25 different kinds of images. The dynamic images themselves have also been sorted into categories on the basis of various common features, coded accordingly and subsequently written onto the disk in the form of index data to enable them to be retrieved at a later point. If a code that will enable an appropriate dynamic image to be extracted from the optical disk is then entered in header A, as shown in FIG. 1, images that match the mood and the contents of the music can then be displayed as required. Moreover, in order to ensure that the processing of the next karaoke music request is carried out as quickly as possible, the invention incorporates a second optical disk unit with an identical structure to the first one on which is stored an identical set of dynamic image groups, thereby enabling the images on each disk to be accessed alternately on request.

Figure 3:
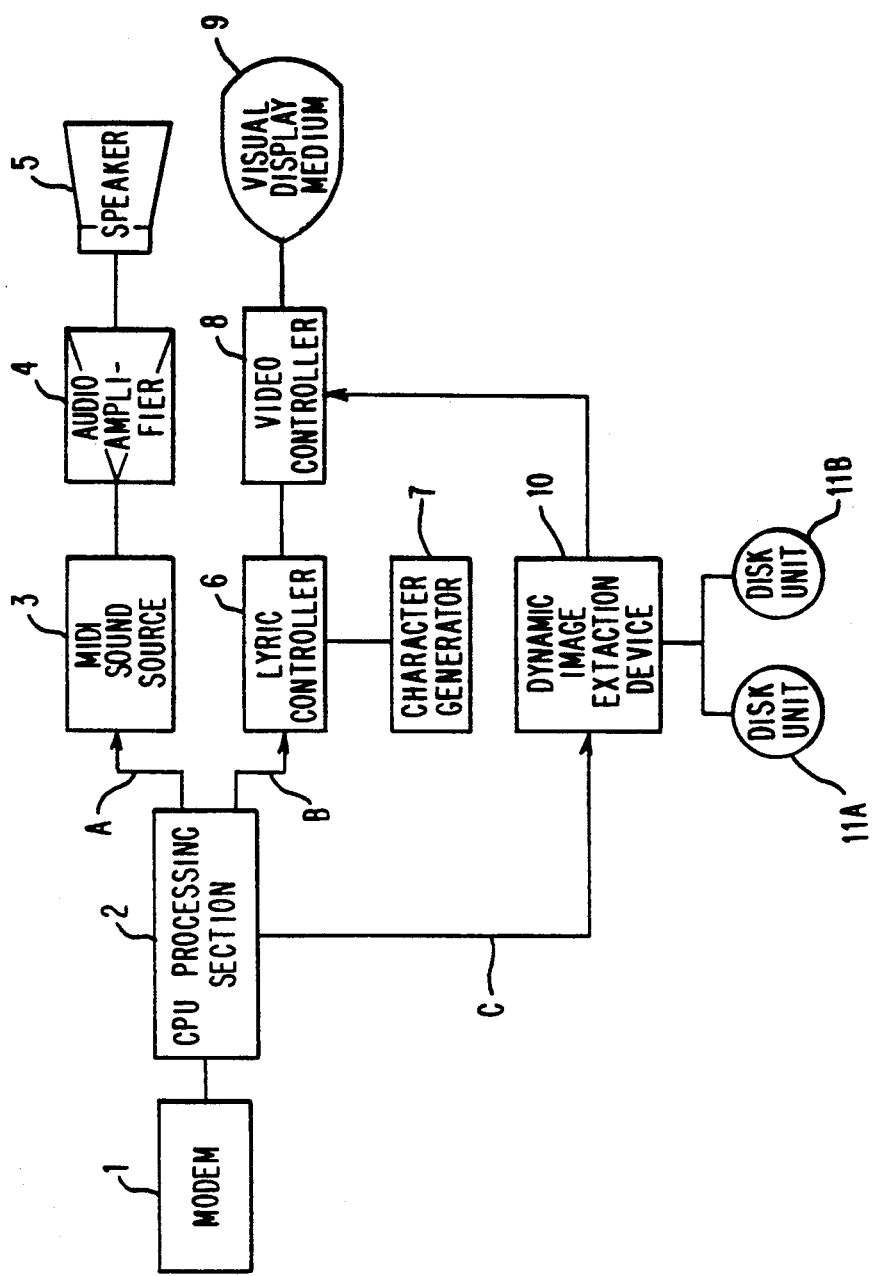
FIG. 3 is a block diagram showing the preferred embodiment of the invention.

The method of coding is optional in that the dynamic images on the second and lowest level of the tree in FIG. 2 can, for example, either each be assigned individual codes or else they can be coded more roughly by giving them each the same code. The first method of code assignment creates a close link between the dynamic image itself and the code written into the header A whereas the second method of code assignment opens the way to index retrieval of a plurality of different images at the same time. Furthermore, if the choice between extracted images is made completely random, this also opens up the possibility that different images might be used to accompany the same piece of karaoke music even when it is reproduced more than once and this will further enhance the effectiveness of the presentation. FIG. 3 shows the user's karaoke terminal device. In the figure, 1 is a modem which is connected by way of a public telephone line with an external host computer (not included in the drawing). The invention is designed to enable the user to access a karaoke music database stored in said host computer and to download the karaoke music of his choice in the form of MIDI data and lyric data. A typical string of data in said downloaded karaoke data is assigned a header A and a footer D, the concept of which is illustrated in FIG. 1. 2 is a data processing section in which the downloaded data is temporarily entered into a buffer. The MIDI data C and the lyric data B are then identified and the MIDI data C output in the form of output a and the lyric data B output in the form of output b. At the same time, signals for the synchronization of features such as the lyric display and character color changes as determined by synchronization codes incorporated into the MIDI data C are also output as a part of output b. Prior to this, however, the codes incorporated into the header A for the purpose of extracting dynamic images in keeping with the content of the music are identified and output in the form of output c.

The data processing section 2 comprises a number of circuits essential to the overall control of the invention including a microprocessor, a buffer memory and an output sequencer. 3 is a MIDI sound source in which the MIDI data received from the data processing section 2 is used to generate audio signals which are then input to an audio amplifier 4 where they undergo waveform modification and amplification after which they are output to a speaker 5 for reproduction as music. 6 is a lyric controller which extracts characters from a character generator 7 in accordance with the lyric data received from the data processing section 2 and outputs them to a video controller 8. The song lyrics are finally displayed on a visual display medium 9 such as a television screen of some sort. 10 is a dynamic image extraction device which drives the two disk units 11a, 11b, extracts the required dynamic images and outputs them to the video controller 8. The video controller 8 then mixes the dynamic images and the song lyrics which it outputs to the visual display medium 9, thereby providing the singer with an appropriate word prompt while at the same time reproducing dynamic images as an aid to the overall presentation. The mixing of the dynamic images and the song lyrics may be accomplished either by superimposition or by any other suitable means.

The dynamic image extraction device 10 first of all drives the optical disk unit 11a in accordance with the code received in output c, retrieves the index data in respect of a plurality of the dynamic images held in store and extracts those dynamic images that match the code. In cases where there is only one image extracted, then this image is output directly to the video controller 8, but in cases where there is more than one dynamic image extracted, one of the said images is selected at random for output to the video controller 8. If a request is then input for a different piece of karaoke music to the piece currently being reproduced, then this data is first saved to the buffer of data processing section 2 and assumes reproduction standby mode. At the same time, the header is retrieved from the data on standby and the dynamic image code relating to the music awaiting reproduction is transmitted to the dynamic image extraction device 10. Said dynamic image extraction device 10 then starts to drive the optical disk unit 11b, which is also in standby mode, retrieves the relevant index data and determines in advance the dynamic images which are to be displayed during the reproduction of the next piece of karaoke music. In this way, it is possible to complete the selection of the dynamic images appropriate to each successive request in advance, thereby substantially reducing the waiting time in each case.

In the preferred embodiment of the invention outlined above, we have used just two optical disk units as a means of preventing the dynamic image extraction operation from delaying the completion of the whole reproduction process. The choice of two optical disk units reflects the fact that a single unit could not otherwise be used for the selection of dynamic images for a subsequent piece of music until the reproduction of the previous piece of music was completed and this would inevitably give rise to delays. On the other hand, since it takes on average about four minutes for the complete reproduction of each individual piece of karaoke music, two optical disk units is quite sufficient and there would be no advantage to be gained by the incorporation of three or more such units into the invention. Each of the two optical disk units is thus loaded with an identical set of dynamic images. It would, of course, be possible to load each of the optical disk units with a different set of dynamic images, thereby doubling the total number of available images but, since this course of action would also significantly increase the amount of time required for the dynamic image extraction operation, we decided against this option. If, on the other hand, it were found that, in a particular case, a short delay would be permissible then it would also be possible to load each of the two separate optical disk units with different sets of dynamic images and use these in a multiple pair installation. In this sort of case, the retrieval of dynamic images would, of course, be carried out sequentially.

The most important feature of the present invention is that it makes use of three different types of data, namely MIDI data, lyric data and dynamic image data, the last of these three types being treated as inessential data, however, in view of its large size. Moreover, by dividing the data in accordance with size into that which is suitable for transmission and that which is not, it has also been possible to reduce the amount of time required for a karaoke data download very significantly. This in turn helps to prevent traffic overloads resulting from the occasional heavy concentration of requests within a short space of time.

Again, by loading identical sets of dynamic image data into two separate optical disk units such that each unit can be driven alternately in response to successive karaoke music requests, using the codes written into each karaoke data header, it has been possible to eliminate the wait time previously required for the extraction of the required dynamic images and in this way to dispense entirely with the inconvenience inherent in holding up the reproduction of the karaoke music itself while waiting for the dynamic images which in practice represent nothing more than an auxiliary form of data. Furthermore, the easy retrieval with the help of simple codes of the index data relating to each individual dynamic image has in turn enabled the inventors to keep the design of the extraction means equally simple.

What is claimed is:

1. In a karaoke music reproduction device which transmits MIDI data and lyric data, which has been converted into digital form and incorporated into a karaoke data string including a header and a footer, by way of a public telephone line, said MIDI data being used for the reproduction of music and said lyric data being used for the display of song lyrics on a visual display medium, a karaoke music reproduction device comprising a dynamic image extraction means that controls a memory means, which writes special codes in advance into a part of said karaoke data string and which holds a number of groups of dynamic images, each of said dynamic images having been assigned a code to match one or other of said special codes, said karaoke music reproduction device inputting the code written into said karaoke data string into a dynamic image extraction means before initiating the reproduction of the karaoke music and accessing said memory means, reading out those dynamic images which have codes corresponding to said special code and mixing said dynamic images with the song lyrics for output to said visual display medium.

2. The karaoke music reproduction device according to claim 1 in which the memory means comprises a pair of memory devices arranged in parallel, each containing an identical set of dynamic images and each being accessed alternately in respect of each successive piece of karaoke music.

3. The karaoke music reproduction device according to claim 2 in which the memory means is an optical disk device.

4. The karaoke music reproduction device according to claim 3 in which said pair of memory devices each comprises an optical disk device which contains different sets of dynamic images and which is accessed sequentially.

5. The karaoke music reproduction device according to claim 1 in which a special code is written into the header of the karaoke data string.

6. The karaoke music reproduction device according to claim 1 in which the lyrics displayed on the aforementioned visual display medium are read out of a character generator in accordance with the aforementioned lyric data and are superimposed on dynamic images in a video control means.

7. The karaoke music reproduction device according to claim 1 in which the codes used for extraction of specified dynamic images from the aforementioned set of dynamic images are arranged in a hierarchical manner.

* * * * *